United States Patent
Oh (10) Patent No.: US 10,447,109 B2
(45) Date of Patent: Oct. 15, 2019

(54) STRUCTURE FOR FIXING CABLE FOR WATERPROOF FAN CASE

(71) Applicant: KPC Co., Ltd., Incheon (KR)

(72) Inventor: Yong Ju Oh, Incheon (KR)

(73) Assignee: KPC CO., LTD., Incheon (KR)

( * ) Notice: Subject to any disclaimer, the term of this patent is extended or adjusted under 35 U.S.C. 154(b) by 391 days.

(21) Appl. No.: 15/511,430

(22) PCT Filed: Sep. 14, 2015

(86) PCT No.: PCT/KR2015/009605
§ 371 (c)(1),
(2) Date: Mar. 15, 2017

(87) PCT Pub. No.: WO2016/043479
PCT Pub. Date: Mar. 24, 2016

(65) Prior Publication Data
US 2017/0264160 A1    Sep. 14, 2017

(30) Foreign Application Priority Data
Sep. 15, 2014    (KR) .................... 10-2014-0122308

(51) Int. Cl.
*H02K 5/22*        (2006.01)
*H02K 5/10*        (2006.01)
(Continued)

(52) U.S. Cl.
CPC .............. *H02K 5/225* (2013.01); *H01R 4/16* (2013.01); *H02K 5/10* (2013.01); *H02K 7/14* (2013.01)

(58) Field of Classification Search
CPC ............ H02K 5/225; H02K 5/10; H02K 7/14; H02K 5/22; H01R 4/16
(Continued)

(56) References Cited

U.S. PATENT DOCUMENTS

| 5,343,103 | A | * | 8/1994 | Aoki | ............... | H01B 17/26 |
| | | | | | | 174/77 R |
| 6,422,839 | B1 | * | 7/2002 | Brockner | ........ | F02M 37/048 |
| | | | | | | 310/87 |
| 2002/0175574 | A1 | * | 11/2002 | Okazaki | ............... | H02K 3/50 |
| | | | | | | 310/68 B |

FOREIGN PATENT DOCUMENTS

JP    06-318791 A    11/1994
JP    09-308175 A    11/1997
(Continued)

*Primary Examiner* — Thomas Truong
(74) *Attorney, Agent, or Firm* — Novick, Kim & Lee, PLLC; Sang Ho Lee (57) ABSTRACT

A structure for fixing a cable for a waterproof fan case according to the present disclosure includes: a frame on which a motor is installed, and a blade is rotatably installed in a state in which a driving shaft of the motor is connected to a front side thereof; an insertion tube which extends rearward from the frame, has therein an insertion hole to which a power line connected to the motor is penetratively coupled in a front and rear direction, and has a gap portion formed to be split at one side in a transverse direction; and a coupling ring which has a hollow portion that is penetratively formed in the front and rear direction so that the coupling ring is correspondingly coupled to an outer circumference of the insertion tube in a male-female manner, and has a pressing protrusion that is formed to protrude on an inner circumferential surface of the coupling ring so as to press and support an outer circumference of the power line through the gap portion when coupling the coupling ring to the insertion tube.

7 Claims, 7 Drawing Sheets

(51) Int. Cl.
*H01R 4/16* (2006.01)
*H02K 7/14* (2006.01)

(58) Field of Classification Search
USPC .................................................. 310/71, 89
See application file for complete search history.

(56) References Cited

FOREIGN PATENT DOCUMENTS

| | | | |
|---|---|---|---|
| JP | 2006-141152 A | 6/2006 | |
| KR | 10-2002-0039148 A | 5/2002 | |
| KR | 10-2007-0104976 A | 10/2007 | |
| KR | 10-2010-0112928 A | 10/2010 | |

* cited by examiner

STRUCTURE FOR FIXING CABLE FOR WATERPROOF FAN CASE

TECHNICAL FIELD

The present disclosure relates to a structure for fixing a cable for a waterproof fan case, and more particularly, to a structure for fixing a cable for a waterproof fan case in which a coupling ring having a pressing protrusion is correspondingly coupled to an outer circumference of an insertion tube so as to press and support an outer circumference of a power line coupled to the insertion tube, such that a position of the power line is not moved or the power line is not withdrawn even though external force is applied to the power line, and as a result, it is possible to prevent impact from being applied to a connecting portion between an electronic device and the power line.

BACKGROUND ART

In general, a blower fan is used as a mean for pumping air by using rotational force of an impeller or a rotor, and used for a humidifier, a refrigerator, an air conditioner, a cleaner, and the like in order to suck and discharge air.

A blower fan in the related art includes a case having a discharge port, a motor installed at a center of the case, and blades rotatably installed to a driving shaft of the motor, and a power line for supplying electric power is electrically connected to the motor.

Here, in most instances, the power line is extended to the outside through a rear side of the case in a state in which the power line is connected to the motor, and the power line is electrically connected to a power supply device.

However, most of the blower fans in the related art have a structure in which the power line is connected to the power supply device in a state in which the power line is not stably fixed, and as a result, there is concern that the power line is moved by external force, and impact is applied to a connecting portion of the power line.

As described above, there is concern that impact is applied to the connecting portion between the power line and the motor and thus the power line may be separated in a case in which a position of the power line is not fixedly maintained and the power line is moved, and accordingly, there is a need for a structure capable of more securely fixing the power line and easily separating the power line as necessary.

As literature associated with the present disclosure, there is Korean Patent Application Laid-Open No. 10-2010-0112928 (Oct. 20, 2010) that discloses a fan motor case sealing member and a fan motor case.

DISCLOSURE

Technical Problem

The present disclosure has been made in an effort to provide structure for fixing a cable for a waterproof fan case in which a coupling ring having a pressing protrusion is correspondingly coupled to an outer circumference of an insertion tube so as to press and support an outer circumference of a power line coupled to the insertion tube, such that a position of the power line is not moved or the power line is not withdrawn even though external force is applied to the power line, and moisture does not permeate into a coupling portion of the power line, and as a result, it is possible to improve waterproof performance, and to allow the power line to be easily attached and detached because of a simple structure.

Technical Solution

An exemplary embodiment of the present disclosure provides a structure for fixing a cable for a waterproof fan case, the structure including: a frame on which a motor is installed, and a blade is rotatably installed in a state in which a driving shaft of the motor is connected to a front side thereof; an insertion tube which extends rearward from the frame, has therein an insertion hole to which a power line connected to the motor is penetratively coupled in a front and rear direction, and has a gap portion formed to be split at one side in a transverse direction; and a coupling ring which has a hollow portion that is penetratively formed in the front and rear direction so that the coupling ring is correspondingly coupled to an outer circumference of the insertion tube in a male-female manner, and has a pressing protrusion that is formed to protrude on an inner circumferential surface of the coupling ring so as to press and support an outer circumference of the power line through the gap portion when coupling the coupling ring to the insertion tube.

Here, a bent member, which has both ends connected to bifurcated end portions of the insertion tube, respectively, and has a relatively smaller thickness than the insertion tube, may be further formed in the gap portion.

In addition, the bent member may be bent and extended to the insertion hole by pressing force of the pressing protrusion, and a bent and extended tip may press and support an outer circumference of the power line.

In addition, the bent and extended tip of the bent member may be formed to have a curved surface.

In addition, an inclined surface, which pushes a rear end of the bent member to the insertion hole when coupling the coupling ring to the insertion tube and prevents the pressing protrusion from being caught, may be further formed at a front end of the pressing protrusion.

In addition, both ends which are split based on the gap portion may form guide surfaces having a width in a direction in which the guide surfaces face each other, and the width is gradually increased in a transverse direction opposite to the insertion hole.

In addition, the guide surfaces may guide the pressing protrusion to the insertion hole when coupling the coupling ring to the insertion tube.

In addition, an auxiliary pressing protrusion, which auxiliarily presses and supports the outer circumference of the power line inserted into the insertion hole, may be further formed to protrude on an inner circumference of the insertion tube.

In addition, the auxiliary pressing protrusion may be positioned on the same line as the pressing protrusion at a position corresponding to the pressing protrusion, and may support, in two directions, both ends of the power line.

Advantageous Effects

According to the present disclosure, the coupling ring having the pressing protrusion is correspondingly coupled to the outer circumference of the insertion tube so as to press and support the outer circumference of the power line coupled to the insertion tube, such that a position of the power line is not moved or the power line is not withdrawn even though external force is applied to the power line, and as a result, it is possible to prevent impact from being applied to a connecting portion between an electronic device and the power line.

In addition, since moisture does not permeate into a coupling portion of the power line, it is possible to improve waterproof performance, and since a structure is simple, it is possible to allow the power line to be easily attached and detached, and to mass-produce the fans at low cost.

DESCRIPTION OF MAIN REFERENCE NUMERALS OF DRAWINGS

| | |
|---|---|
| 10: Motor | 20: Blade |
| 100: Frame | 110: Coupler |
| 120: Discharge ports | 200: Insertion tube |
| 210: Insertion hole | 220: Gap portion |
| 221: Guide surfaces | 230: Bent member |
| 231: Curved surface | 240: Auxiliary pressing protrusion |
| 300: Coupling ring | 310: Hollow portion |
| 320: Pressing protrusion | 321: Inclined surface |
| C: Power line | |

[Best Mode]

Hereinafter, exemplary embodiments of the present disclosure will be described in detail with reference to the accompanying drawings.

Advantages and features of the present disclosure and methods of achieving the advantages and features will be clear with reference to exemplary embodiments described in detail below together with the accompanying drawings.

However, the present disclosure is not limited to the exemplary embodiments disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

In addition, in the description of the present disclosure, a detailed explanation of publicly known related technologies may be omitted so as to avoid unnecessarily obscuring the subject matter of the present disclosure.

Figure 1:
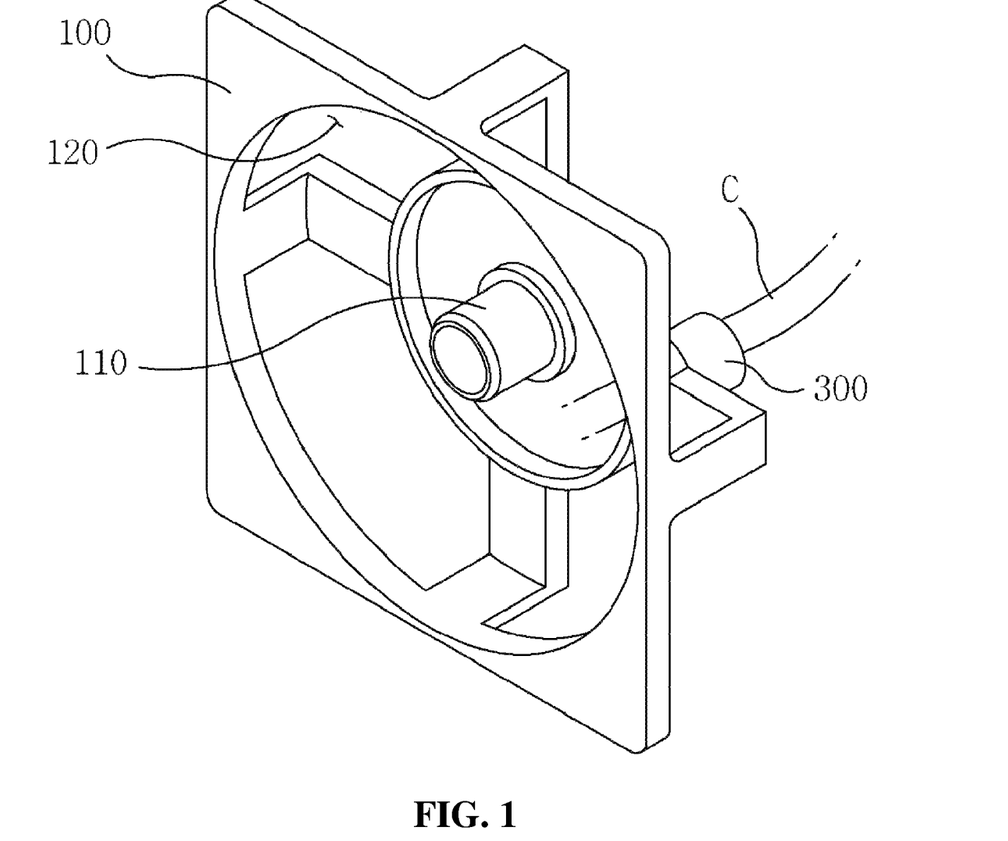
FIG. 1 is a perspective view illustrating a structure for fixing a cable for a waterproof fan case according to the present disclosure.
Figure 2:
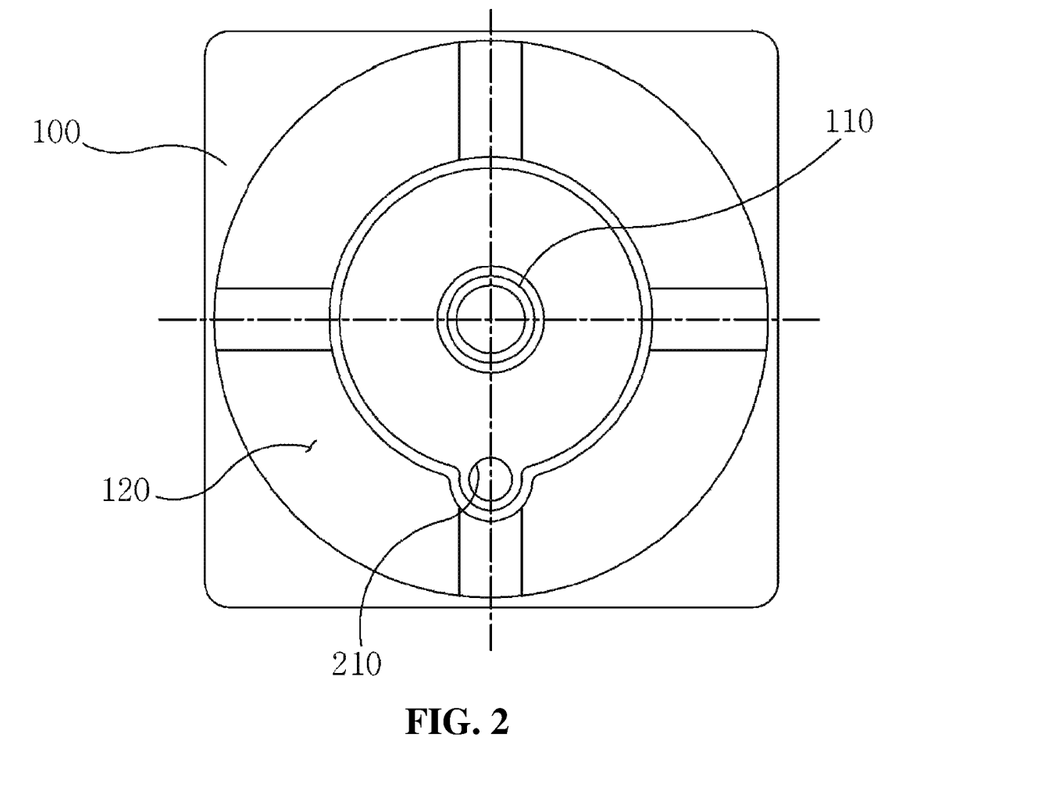
FIG. 2 is a front view illustrating the structure for fixing a cable for a waterproof fan case according to the present disclosure.

FIG. 1 is a perspective view illustrating a structure for fixing a cable for a waterproof fan case according to the present disclosure, and FIG. 2 is a front view illustrating the structure for fixing a cable for a waterproof fan case according to the present disclosure.

Figure 3:
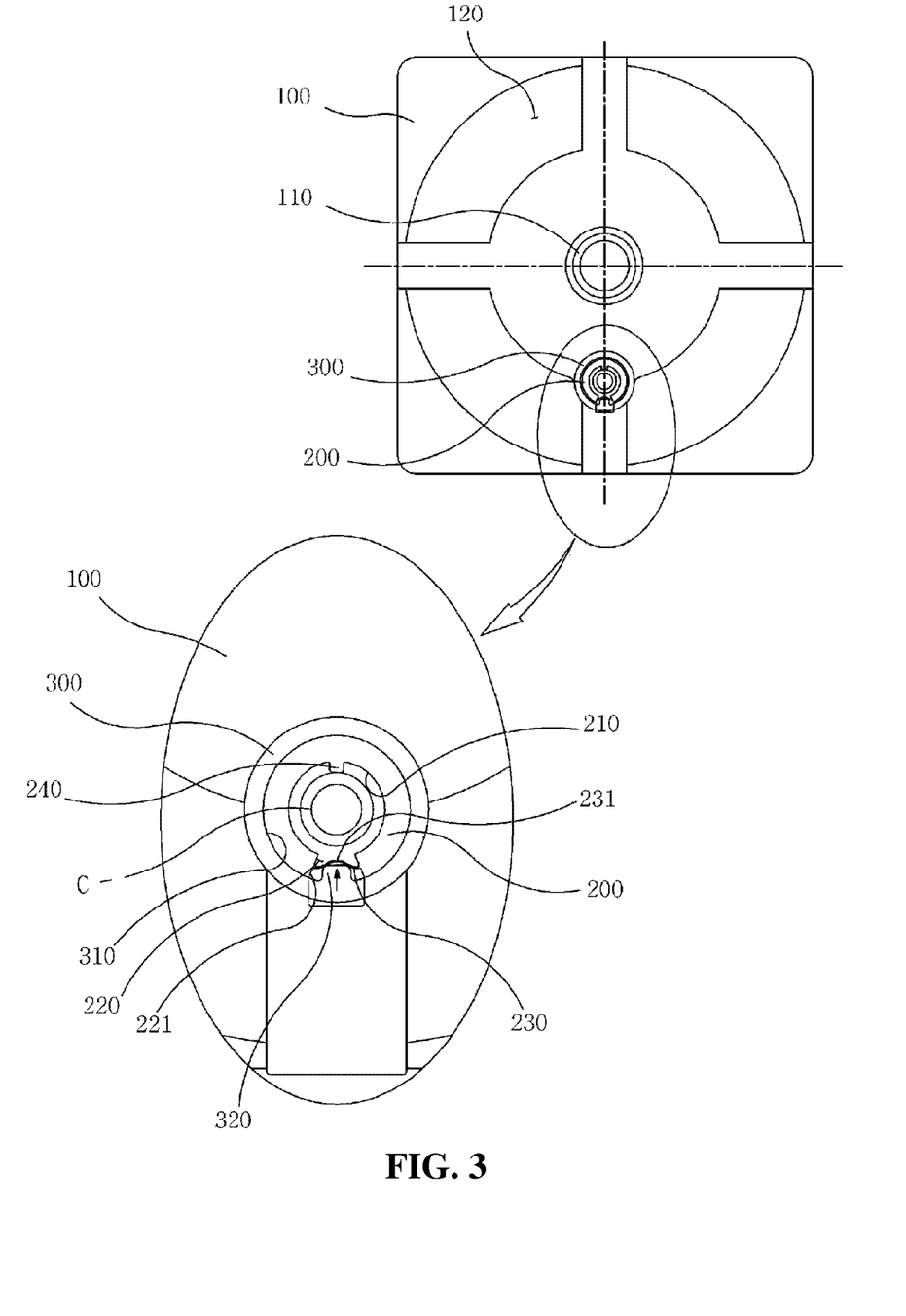
FIG. 3 is a rear view illustrating the structure for fixing a cable for a waterproof fan case according to the present disclosure.
Figure 4:
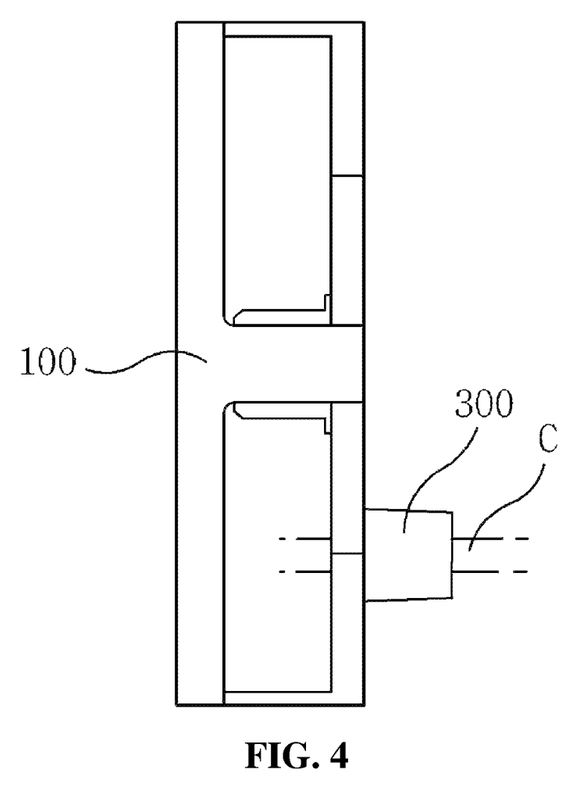
FIG. 4 is a side view illustrating the structure for fixing a cable for a waterproof fan case according to the present disclosure.

Further, FIG. 3 is a rear view illustrating the structure for fixing a cable for a waterproof fan case according to the present disclosure, and FIG. 4 is a side view illustrating the structure for fixing a cable for a waterproof fan case according to the present disclosure.

Figure 5:
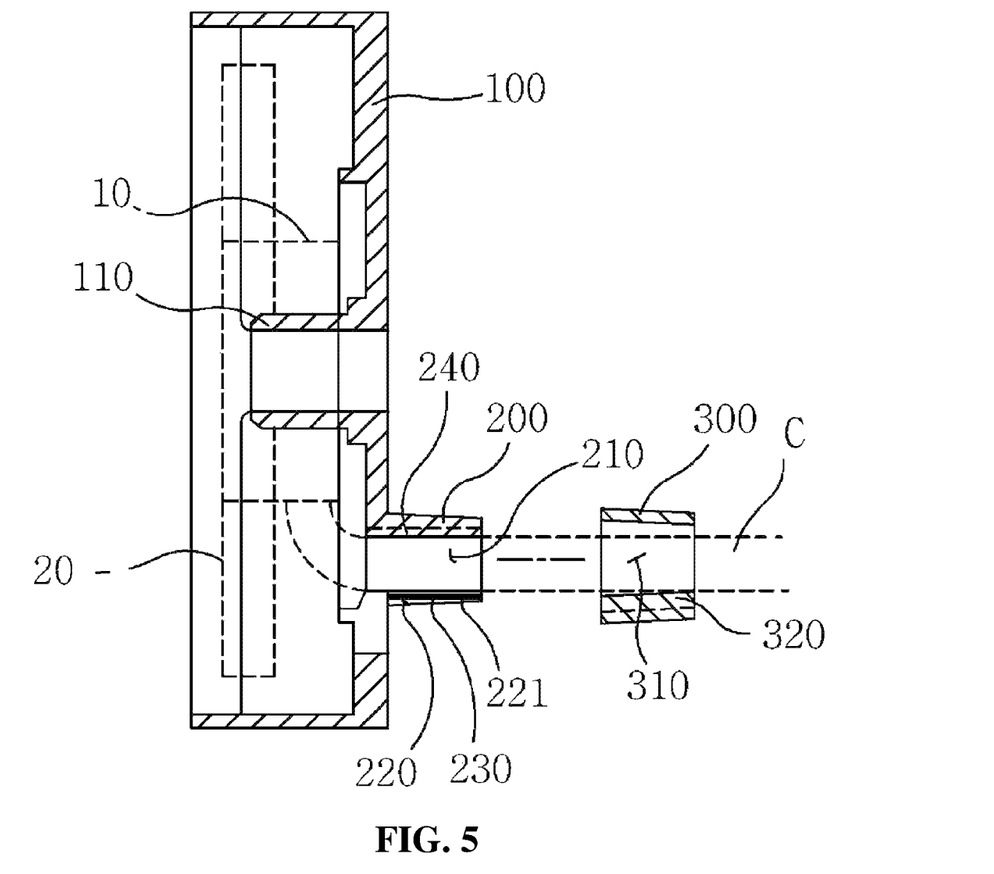
FIG. 5 is a cross-sectional side view illustrating the structure for fixing a cable for a waterproof fan case according to the present disclosure.
Figure 6:
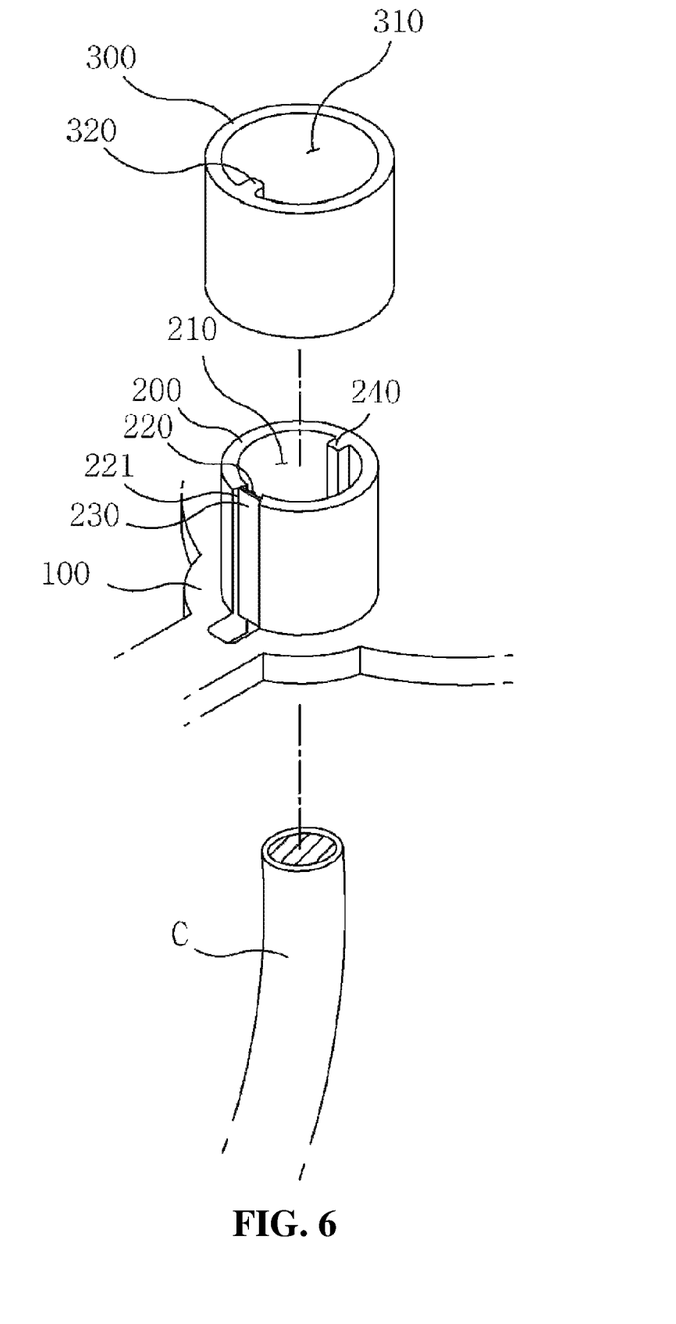
FIG. 6 is a main part enlarged perspective view illustrating in detail an insertion tube and a coupling ring of the structure for fixing a cable for a waterproof fan case according to the present disclosure.

In addition, FIG. 5 is a cross-sectional side view illustrating the structure for fixing a cable for a waterproof fan case according to the present disclosure, and FIG. 6 is a main part enlarged perspective view illustrating in detail an insertion tube and a coupling ring of the structure for fixing a cable for a waterproof fan case according to the present disclosure.

Referring to FIGS. 1 to 6, a structure for fixing a cable for a waterproof fan case according to the present disclosure includes a frame 100, an insertion tube 200, and a coupling ring 300.

First, a motor 10 may be installed at a central portion (front or rear portion) of the frame 100, and a blade 20 may be rotatably installed to a driving shaft that protrudes forward from the motor 10.

Otherwise, a front end of the motor 10 may be installed on a rear surface of the frame 100, and in this case, the driving shaft of the motor 10 may protrude forward from the frame 100.

Further, a center of the blade 20 may be rotatably coupled to the driving shaft that protrudes forward from the frame 100.

In addition, as illustrated in FIGS. 1 and 4, a coupler 110 to which the motor 10 or the driving shaft of the motor 10 may be penetratively coupled in a front and rear direction may be formed on a front surface of the frame 100 so as to protrude forward.

For example, in a case in which the motor 10 is coupled to the rear surface of the frame 100, the blade 20 may be rotatably coupled to the driving shaft that protrudes forward from the coupler 110.

Further, as illustrated in FIGS. 1 and 2, the frame 100 may have a quadrangular frame shape, and discharge ports 120 through which air may pass may be penetratively formed in the front and rear direction at a part of the frame 100. Of course, although not illustrated, the frame 100 may be formed as a circular or polygonal frame.

The insertion tube 200 serves to fix a power line C for supplying electric power to the motor 10, and the insertion tube 200 may extend rearward from the frame 100.

Here, the insertion tube 200 may be formed in the form of a cylindrical tube in which an insertion hole 210 is penetratively formed in the front and rear direction, and a circumference thereof is defined in a transverse direction.

Of course, in addition to the cylindrical shape, the insertion tube 200 may be formed in the form of a polygonal tube in which a polygon is formed in the transverse direction.

The insertion hole 210 may have a diameter greater than a thickness of the power line C in a longitudinal direction in order to allow the power line C to be smoothly penetratively coupled before the coupling ring 300 to be described below is coupled.

Further, the insertion hole 210 may have a shape corresponding to a shape of the power line C, and in a case in which a longitudinal cross section of the power line C has a circular shape, the insertion hole 210 may also have a corresponding circular shape.

In addition, the insertion tube 200 may have a tapered shape of which the diameter is gradually increased toward the rear surface of the frame 100 in order to increase coupling strength.

Here, various diameters and various shapes of the insertion tube 200 may be applied in accordance with a shape and a diameter of the power line C.

Further, a gap portion 220, which is formed by splitting a part of the circumference of the insertion tube 200 in both directions, is formed at one side in the transverse direction of the insertion tube 200.

The gap portion 220 defines a gap through which a pressing protrusion 310 to be described below may enter, to a predetermined length, an insertion hole 210 into which the power line C is inserted.

The gap portion 220 may have a length in the front and rear direction of the insertion tube 200, and may have a length corresponding to or longer than that of the pressing protrusion 320 to be described below.

That is, when the coupling ring 300 to be described below is correspondingly coupled outside the insertion tube 200, the pressing protrusion 310 may be inserted into the insertion hole 210 through the gap portion 220, thereby pressing and supporting an outer circumference of the power line C.

Further, both ends of the insertion tube 200, which are split based on the gap portion 220, may have guide surfaces 221 having a width in a direction in which the guide surfaces 221 face each other, and the width is gradually increased in the transverse direction opposite to the insertion hole 210.

When the coupling ring 300 to be described below is coupled to an outer circumference of the insertion tube 200 through a rear side of the insertion tube 200, the guide surfaces 221 may guide the pressing protrusion 320 to be described below to the insertion hole 210.

That is, an inlet of the gap portion 220 into which the pressing protrusion 320 to be described below is inserted may be largely formed by the guide surfaces 221.

Therefore, it is possible to easily couple the coupling ring 300 to be described below to the outer circumference of the insertion tube 200 by using the guide surfaces 221.

In particular, a bent member 230, which has a relatively smaller thickness than the insertion tube, may be formed in the gap portion 220.

Both ends of the bent member 230 may be integrally coupled to both ends of the insertion tube 200 which are split based on the gap portion 220, respectively.

Here, the bent member 230 may be made of a material identical to a material of the insertion tube 200, and the bent member 230 may have a relatively smaller thickness than the insertion tube 200.

Further, both ends of the bent member 230 may be coupled to central portions of both split ends of the insertion tube 200, or may be connected to be biased in a direction toward the insertion hole 210 or in the opposite direction.

In addition, the bent member 230 may be made of a synthetic resin material integrally with the insertion tube 200, or may be made of a material such as metal.

The bent member 230 is bent and extended to an interior of the insertion hole 210 by pressing force applied in the transverse direction by the pressing protrusion 310.

In this case, a bent and extended tip of the bent member 230 may be formed to have a curved surface in order to prevent damage to an outer sheath of the power line C. The bent and extended tip of the bent member 230 may press and support, in the transverse direction, the outer circumference of the power line C inserted into the insertion hole 210.

The coupling ring 300 is correspondingly coupled to the insertion tube 200 in a male-female manner through the rear side of the insertion tube 200, and bends and extends the bent member 230, which is formed in the gap portion 220 and has a small thickness, to the interior of the insertion hole 210.

In this case, the tip of the bent member 230, which is bent and extended to the interior of the insertion hole 210, presses and support the outer circumference of the power line C, thereby preventing the power line C from being moved in the insertion hole 210 or withdrawn to the outside.

To this end, a hollow portion 310 may be penetratively formed in the coupling ring 300 in the front and rear direction so that the coupling ring 300 is correspondingly coupled to the outer circumference of the insertion tube 200 in a male-female manner.

Here, the hollow portion 310 may have a shape correspond to the insertion tube 200 so that the hollow portion 310 may come into close contact with the outer circumference of the insertion tube 200.

For example, the coupling ring 300 may be formed in the form of a cylindrical tube in which a circumference is formed in the transverse direction.

Of course, in addition to the cylindrical shape, the coupling ring 300 may be formed in the form of a polygonal tube in which a polygon is formed in the transverse direction.

Further, a pressing protrusion 320, which presses and supports an outer circumference of the power line C through the gap portion 220 when the coupling ring 300 is correspondingly coupled to the outer circumference of the insertion tube 200, is formed to protrude on an inner circumferential surface of the coupling ring 300.

The pressing protrusion 320 has a length in the front and rear direction of the coupling ring 300, and may have a width equal to or smaller than that of the gap portion 220.

An extended tip of the pressing protrusion 320 may be further extended into the insertion hole 210 than the bent member 230.

That is, when the coupling ring 300 is coupled outside the insertion tube 200, the tip of the pressing protrusion 320 bends the bent member 230 to the interior of the insertion hole 210, and the bent and extended tip of the bent member 230 may press and support the outer circumference of the power line C.

Furthermore, an auxiliary pressing protrusion 240, which auxiliarily presses and supports the outer circumference of the power line C inserted into the insertion hole 210, may be further formed to protrude on an inner circumference of the insertion tube 200.

The auxiliary pressing protrusion 240 may auxiliarily press and support the outer circumference of the power line C in a state in which the auxiliary pressing protrusion 240 is positioned on the same line as the pressing protrusion 320 at a position corresponding to the pressing protrusion 320.

In this state, the auxiliary pressing protrusion 240, together with the pressing protrusion 320 correspondingly positioned opposite to the auxiliary pressing protrusion 240, may support, in two directions, both ends of the power line C penetratively coupled in the insertion hole 210.

Therefore, the auxiliary pressing protrusion 240 and the pressing protrusion 320 doubly press and support the outer circumference of the power line C, and as a result, it is possible to more securely support the power line C only by using a simple structure.

Figure 7:
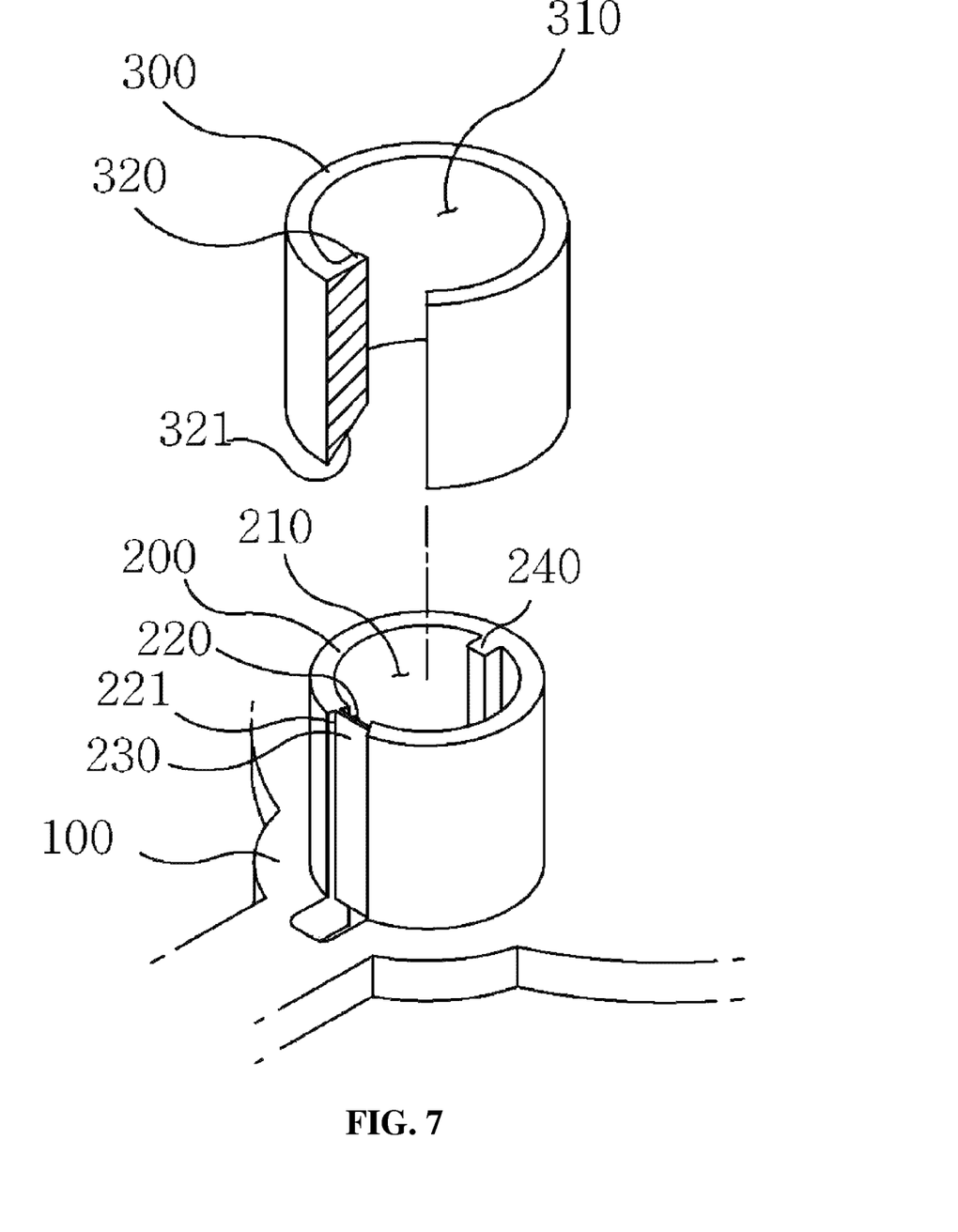
FIG. 7 is a main part enlarged view illustrating a state in which an inclined surface is formed on a pressing protrusion in the structure for fixing a cable for a waterproof fan case according to the present disclosure.

Meanwhile, as illustrated in FIG. 7, an inclined surface 321, which may push a rear end of the bent member 230 into the insertion hole 210 when coupling the coupling ring 300 to the insertion tube 200, may be further formed at a front end of the pressing protrusion 320.

The inclined surface 321 serves to push the lower end of the bent member 230 into the insertion hole 210 at the initial time when coupling the coupling ring 300 to the outer circumference of the insertion tube 200.

Therefore, the inclined surface 321 may prevent the pressing protrusion 320 and the rear end of the bent member 230 from being caught by each other, and as a result, it is possible to easily couple the coupling ring 300 to the outer circumference of the insertion tube 200.

The structure for fixing a cable for a waterproof fan case according to the present disclosure, which has been described above, may be applied to various waterproof devices (humidifiers or the like), which may be cleaned, and may be widely used.

Consequently, according to the present disclosure, the coupling ring 300 having the pressing protrusion 320 is correspondingly coupled to an outer circumference of the insertion tube 200, and presses and supports the outer circumference of the power line coupled to the insertion tube 200, such that a position of the power line C is not moved or the power line C is not withdrawn even though external force is applied to the power line C, and impact is not transmitted to the connecting portion of the power line C, and as a result, it is possible to prevent the connecting portion between the power line C and the motor 10 from being separated, or to prevent a connection defect.

In addition, since moisture does not permeate into the coupling portion of the power line C, it is possible to improve waterproof performance, and since a structure is simple, it is possible to allow the power line to be easily attached and detached, and to mass-produce the fans at low cost.

While the specific exemplary embodiments related with the structure for fixing a cable for a waterproof fan case according to the present disclosure have been described above, the exemplary embodiments may be modified to various exemplary embodiments without departing from the scope of the present invention.

Therefore, the scope of the present disclosure should not be limited to the described exemplary embodiment, but should be defined by the appended claims and the equivalents of the claims.

Accordingly, it should be understood that the aforementioned exemplary embodiment is described for illustration in all aspects and is not limited, and the scope of the present disclosure shall be represented by the claims to be described below, instead of the detailed description, and it should be construed that all of the changes or modified forms induced from the meaning and the scope of the claims, and an equivalent concept thereto are included in the scope of the present disclosure.

The invention claimed is:

1. A structure for fixing a cable for a waterproof fan case, the structure comprising:
a frame on which a motor is installed, and a blade is rotatably installed in a state in which a driving shaft of the motor is connected to a front side thereof;
an insertion tube which extends rearward from the frame, has therein an insertion hole to which a power line connected to the motor is penetratively coupled in a front and rear direction, and has a gap portion formed to be split at one side in a transverse direction; and
a coupling ring which has a hollow portion that is penetratively formed in the front and rear direction so that the coupling ring is correspondingly coupled to an outer circumference of the insertion tube in a male-female manner, and has a pressing protrusion that is formed to protrude on an inner circumferential surface of the coupling ring so as to press and support an outer circumference of the power line through the gap portion when coupling the coupling ring to the insertion tube.

2. The structure according to claim 1, wherein a bent member, which has both ends connected to bifurcated end portions of the insertion tube, respectively, and has a relatively smaller thickness than the insertion tube, is further formed in the gap portion, and the bent member is bent and extended to the insertion hole by pressing force of the pressing protrusion, and a bent and extended tip presses and supports an outer circumference of the power line.

3. The structure according to claim 2, wherein the bent and extended tip of the bent member is formed to have a curved surface.

4. The structure according to claim 2, wherein an inclined surface, which pushes a rear end of the bent member to the insertion hole when coupling the coupling ring to the insertion tube and prevents the pressing protrusion from being caught, is further formed at a front end of the pressing protrusion.

5. The structure according to claim 1, wherein both ends which are split based on the gap portion form guide surfaces having a width in a direction in which the guide surfaces face each other, and the width is gradually increased in a transverse direction opposite to the insertion hole, and the guide surfaces guide the pressing protrusion to the insertion hole when coupling the coupling ring to the insertion tube.

6. The structure according to claim 1, wherein an auxiliary pressing protrusion, which auxiliarily presses and supports the outer circumference of the power line inserted into the insertion hole, is further formed to protrude on an inner circumference of the insertion tube.

7. The structure according to claim 6, wherein the auxiliary pressing protrusion is positioned on a same line as the pressing protrusion at a position corresponding to the pressing protrusion, and supports, in two directions, both ends of the power line.

* * * * *